United States Patent
Szente et al.

[11] 3,880,849
[45] Apr. 29, 1975

[54] THIOPHENES
[75] Inventors: Andre Szente; Joseph Hellerbach, both of Basel, Switzerland
[73] Assignee: Hoffman-La Roche Inc., Nutley, N.J.
[22] Filed: Aug. 22, 1973
[21] Appl. No.: 390,627

[30] Foreign Application Priority Data
Aug. 31, 1972 Switzerland.................... 12839/72
Mar. 2, 1973 Switzerland.................... 3098/73

[52] U.S. Cl.... 260/244 R; 260/243 B; 260/247.1 P; 260/268 FT; 260/293.68; 260/295.5 R; 260/306.7; 260/307 F; 260/307 H; 260/309.7; 260/310 D; 260/326.82; 260/329 S; 260/329 AM; 260/332.2 R; 260/332.2 A; 260/332.3 R; 260/332.5; 424/246; 424/248; 424/250; 424/266; 424/267; 424/269; 424/270; 424/272; 424/273; 424/274; 424/275
[51] Int. Cl............................................. C07d 63/12
[58] Field of Search ..... 260/244, 329, 332.5, 332.3, 260/332.2, 295, 247.1, 326.82, 306.7, 307, 293.68, 268

[56] References Cited
OTHER PUBLICATIONS
Dell'Erba et al., Tetrahedron, Vol. 21, pp. 1061–1066, (1965).
Leandri et al., Chem. Abst., Vol. 55, col. 21091–21092, (1961).
Profft et al., Chem. Abst. Vol. 61, col. 8254–8256, (1964).

Primary Examiner—Harry I. Moatz
Attorney, Agent, or Firm—Samuel L. Welt; Jon S. Saxe; Gerald S. Rosen

[57] ABSTRACT
Compound represented by the formula

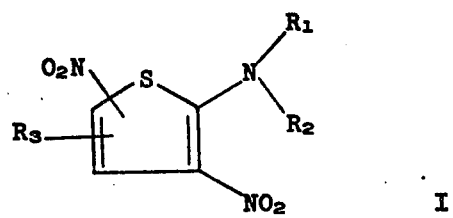

wherein $R_1$ represents lower alkyl, lower alkenyl, lower alkynyl, halo lower alkyl, hydroxy lower alkyl, lower alkoxy lower alkyl, lower alkylthio lower alkyl, lower alkylcarbonyl, halo lower alkylcarbonyl, lower alkanoyloxy lower alkyl, lower aroyloxy lower alkyl, pyridylcarbonyloxy lower alkyl, lower alkylaminocarbonyloxy lower alkyl or

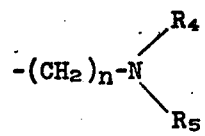

in which $R_4$ and $R_5$ each represent hydrogen or lower alkyl or $R_4$ and $R_5$ together with the nitrogen atom to which they are attached represent a 3-, 5-, 6- or 7-membered saturated heterocyclic ring which, in the case of a 5-, 6- or 7-membered ring, may contain a further nitrogen atom or an oxygen or sulphur atom and may be substituted by lower alkyl or hydroxy lower alkyl and n stands for 1, 2, 3 or 4, $R_2$ represents hydrogen, lower alkyl, lower alkenyl, lower alkynyl, lower alkoxy lower alkyl or hydroxy lower alkyl or $R_1$ and $R_2$ together with the nitrogen atom to which they are attached represent a 3-, 5-, 6- or 7-membered saturated heterocyclic ring which, in the case of a 5-, 6- or 7-membered ring, may contain a further nitorgen atom or an oxygen or sulphur atom and may be substituted by lower alkyl or hydroxy lower alkyl and $R_3$ represents hydrogen or halogen or lower alkyl, provided that when $R_1$ represents lower alkyl and $R_2$ and $R_3$ each represent hydrogen and the variable nitro group is present in the 5-position, then $R_1$ represents lower alkyl containing 2 to 7 carbon atoms, and pharmaceutically acceptable acid addition salts of those compounds described herein which are basic and thus amenable to forming acid addition salts having protozoacidal, bactericidal, anthelmintic and schistosomicidal activity are disclosed.

43 Claims, No Drawings

THIOPHENES

DETAILED DESCRIPTION OF THE INVENTION

This invention relates to thiophene compounds having protozoacidal, bactericidal, anthelmintic and schistosomicidal activity. The thiophene compounds of this invention are represented by the formula

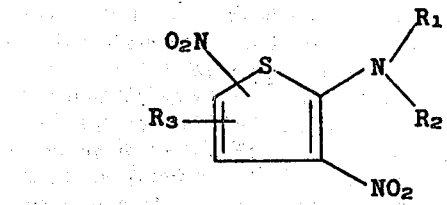

wherein $R_1$ represents lower alkyl, lower alkenyl, lower alkynyl, halo lower alkyl, hydroxy lower alkyl, lower alkoxy lower alkyl, lower alkylthio lower alkyl, lower alkylcarbonyl, halo lower alkylcarbonyl, lower alkanoyloxy lower alkyl, lower aroyloxy lower alkyl, pyridylcarbonyloxy lower alkyl, lower alkylaminocarbonyloxy lower alkyl or

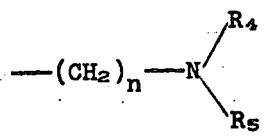

in which $R_4$ and $R_5$ each represent hydrogen or lower alkyl or $R_4$ and $R_5$ together with the nitrogen atom to which they are attached represent a 3-, 5-, 6- or 7-membered saturated heterocyclic ring which, in the case of a 5-, 6- or 7-membered ring, may contain a further nitrogen atom or an oxygen or sulphur atom and may be substituted by lower alkyl or hydroxy lower alkyl and n stands for 1, 2, 3 or 4, $R_2$ represents hydrogen, lower alkyl, lower alkenyl, lower alkynyl, lower alkoxy lower alkyl or hydroxy lower alkyl or $R_1$ and $R_2$ together with the nitrogen atom to which they are attached represent a 3-, 5-, 6- or 7-membered saturated heterocyclic ring which, in the case of a 5-, 6- or 7-membered ring, may contain a further nitrogen atom or an oxygen or sulphur atom and may be substituted by lower alkyl or hydroxy lower alkyl and $R_3$ represents hydrogen or halogen or lower alkyl, provided that when $R_1$ represents lower alkyl and $R_2$ and $R_3$ each represent hydrogen and the variable nitro group is present in the 5-position, then $R_1$ represents lower alkyl containing 2 to 7 carbon atoms, and pharmaceutically acceptable acid addition salts of those compounds described herein which are basic and thus amenable to forming acid addition salts.

As used herein, the term "lower alkyl", alone or in combinations such as, for example, in "lower alkoxy," "lower alkoxy lower alkyl", "lower alkylcarbonyl", "halo lower alkyl", "halo lower alkylcarbonyl" or "lower alkylthio lower alkyl" includes branched-chain and straight-chain hydrocarbon groups containing up to 7 carbon atoms such as methyl, ethyl, propyl, isopropyl, butyl, tertbutyl, pentyl and the like. The terms "lower alkenyl" and "lower alkynyl" include branched-chain or straight-chain unsaturated hydrocarbon groups containing 2 to 7 carbon atoms such as, for example, allyl, propenyl, butenyl, pentenyl, 1,1-dimethyl-propenyl, ethynyl and propargyl. The term "alkanoyl," alone or in combination includes groups derived from branched-chain or straight-chain aliphatic carboxylic acids containing up to 6 carbon atoms such as, for example, acetyl, propionyl, butyryl and the like. The term "aroyloxy" includes groups derived from aromatic carboxylic acids containing 7–15 carbon atoms such as, for example, benzoyloxy and naphthoyloxy, the aromatic nucleus being optionally substituted by lower alkyl. The term "halogen" includes fluorine, chlorine, bromine and iodine. Examples of 3-, 5-, 6- and 7-membered saturated heterocyclic rings are the aziridinyl, pyrrolidinyl, piperidinyl and azepinyl rings. Corresponding 5-, 6- or 7-membered saturated heterocyclic rings containing a further hetero atom are the thiazolidine, isoxazolidine, pyrazolidine, imidazolidine, oxazolidine, piperazinyl, morpholinyl, thiamorpholinyl, diazepinyl, thiazepinyl and oxazepinyl rings. The term "acid addition salts" includes known pharmaceutically acceptable acids, e.g., mineral acids such a hydrochloric, hydrobromic, sulfuric, etc. and organic acids such as acetic, succinic, maleic, benzenesulfonic, toluenesulfonic, methanesulfonic, etc.

Preferred compounds of formula I are those in which the variable nitro group is present in the 5-position, particularly those in which $R_1$ represents lower alkyl, $R_2$ represents hydrogen or lower alkyl and $R_3$ represents hydrogen. Other preferred compounds of formula I are those in which $R_1$ represents

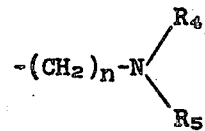

wherein $R_4$, $R_5$ and n have the significance given above.

Preferred are those compounds in which $R_4$ and $R_5$ together with the nitrogen atom to which they are attached represent a 6-membered saturated heterocyclic ring and n stands for 2 and $R_2$ and $R_3$ are each hydrogen. As especially preferred 6-membered saturated heterocyclic ring is the morpholinyl ring.

A further preferred group of compounds represented by formula I are those in which $R_1$ represents alkenyl and $R_2$ represents hydrogen or lower alkyl. Especially preferred are those compounds in which $R_2$ represents lower alkyl group, preferably methyl, and $R_3$ represents hydrogen.

Of the compounds represented by formula I the following are preferred in this invention:

2-(3,5-dinitro-2-thienyl)-isoxazolidine,
1-(3,5-dinitro-2-thienyl)-aziridine,
4-(3,5-dinitro-2-thienyl)-morpholine,
1-(3,5-dinitro-2-thienyl)-pyrrolidine,
3-(3,5-dinitro-2-thienyl)-thiazolidine,
1-(3,5-dinitro-2-thienyl)-piperidine,
4-(3,5-dinitro-2-thienyl)-1-piperazine-ethanol,
1-(3,5-dinitro-2-thienyl)-4-methylpiperazine,
2-(3,5-dinitro-2-thienyl)-tetrahydro-2H-1,2-oxazine,
2-chloro-N-(3,5-dinitro-2-thienyl)-acetamide,
2-bromo-N-(3,5-dinitro-2-thienyl)-acetamide,
4-chloro-N-(3,5-dinitro-2-thienyl)-butyramide, 2-chloro-N-(3,5-dinitro-2-thienyl)-N-methyl-acetamide,
N-(2-chloroethyl)-3,5-dinitro-2-thiophenamine,
4-[2-[(3,5-dinitro-2-thienyl)-amino]-ethyl]-morpholine,
N'-(3,5-dinitro-2-thienyl)-N,N-diethylethylenediamine,
N'-(3,5-dinitro-2-thienyl)-N,N-diethyl-1,3-propanediamine,
2-[(3,5-dinitro-2-thienyl)-amino]-ethylmethylcarbamate,
4-[(3,5-dinitro-2-thienyl)-amino]-1-butanol,
N-(2-methoxyethyl)-N-methyl-3,5-dinitro-2-thiophenamine,
N-(3-ethoxypropyl)-3,5-dinitro-2-thiophenamine,
N'-(3,5-dinitro-2-thienyl)-N,N-dimethylethylenediamine,
1-[(3,5-dinitro-2-thienyl)-amino]-2-propanol,
2-[(3,5-dinitro-2-thienyl)-amino]-isonicotinic acid ethyl ester,
N-[2-(methylthio)-ethyl]-3,5-dinitro-2-thiophenamine,
2-[(3,5-dinitro-2-thienyl)-amino]-acetic acid ethyl ester,
N-isobutyl-3,5-dinitro-2-thiophenamine,
N-secbutyl-3,5-dinitro-2-thiophenamine,
N-allyl-3,5-dinitro-2-thiophenamine,
N-isopropyl-3,5-dinitro-2-thiophenamine,
N-ethyl-3,5-dinitro-2-thiophenamine,
N-butyl-3,5-dinitro-2-thiophenamine,
N-(2-methoxyethyl)-3,5-dinitro-2-thiophenamine,
2-[(3,5-dinitro-thienyl)-amino]-ethanol,
N,N-dimethyl-3,5-dinitro-2-thiophenamine,
N-allyl-N-methyl-3,5-dinitro-2-thiophenamine,
N-isobutyl-N-methyl-3,5-dinitro-2-thiophenamine and
N-ethyl-N-methyl-3,5-dinitro-2-thiophenamine.

The compounds of this invention are prepared by the following methods:

a. reacting a compound represented by the formula

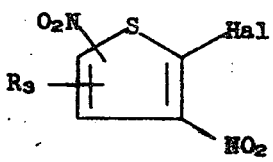 II wherein Hal stands for chlorine, bromine or iodine and $R_3$ has the significance given above,
with an amine represented by the formula

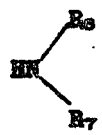 III wherein $R_6$ represents lower alkyl containing 2 to 7 carbon atoms, lower alkenyl, lower alkynyl, halo lower alkyl, hydroxy lower alkyl, lower alkoxy lower alkyl or lower alkylthio lower alkyl or $R_6$ and $R_7$ together with the nitrogen atom to which they are attached represent a 3-, 5-, 6- or 7-membered saturated heterocyclic ring which, in the case of a 5-, 6- or 7-membered ring, may contain a further nitrogen atom or an oxygen or sulphur atom and which may be substituted by lower alkyl or hydroxy lower alkyl,
or a pharmaceutically acceptable acid addition salt thereof.

This reaction is carried out in an inert solvent such as, for example, an aqueous lower alkanol, perferably methanol or ethanol, dimethylformamide, a chlorinated hydrocarbon, preferably methylene chloride or chloroform, or dimethyl sulphoxide. The reaction is advantageously carried out at a temperature between 0°C. and the boiling point of the reaction mixture. An especially preferred temperature lies at between 15°C. and 40°C. The pressure is not critical; the reaction is preferably carried out in an open vessel. If the amine represented by formula III is used in the form of a salt such as, for example, a hydrohalide, a weak base such as, for example, potassium carbonate is expediently added to the reaction mixture. The working up of the reaction mixture is carried out in the usual manner by removal of the solvent and recrystallization of the residue.

b. nitrating a compound represented by the formula

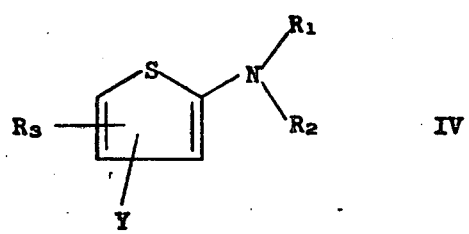 IV wherein $R_1$, $R_2$ and $R_3$ have the significance given above and wherein $R_3$ is present either in the 4- or in the 5-position and Y represents hydrogen or nitro.

For this reaction it is immaterial whether Y represents hydrogen or nitro in a compound represented by formula IV. In either case, a compound represented by formula IV is expediently first dissolved in concentrated sulphuric acid at a low temperature, preferably 0°–20°C., and then pre-cooled, for example, at 0°–20°C., concentrated sulphuric acid and concentrated nitric acid are added with cooling. The procedure by which the nitric acid is introduced into the mixture is, however, not critical. For example, sodium nitrate can also be added to sulphuric acid. It is important only that the nitric acid is present in approximately a stoichiometric amount or in a slight excess and the temperature is kept sufficiently low and remains controllable. The latter is achieved in a simple manner by carefully adding the nitrating agent dropwise. After the nitrating agent has been added, the mixture is poured on to ice and extracted with, for example, ethyl acetate. The ethyl acetate extracts are washed several times with water, dried and evaporated. The residue is then purified by conventional means known to the art.

c. reacting a compound represented by the formula

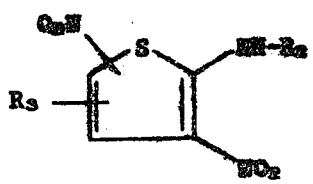 V wherein $R_2$ and $R_3$ have the significance given above,
with a lower alkylating, lower alkenylating, lower alkynylating or lower alkanoylating agent, the alkyl group in the lower alkylating agent being substituted if desired by halogen, hydroxy, lower alkoxy, lower alkanoyloxy, lower aroyloxy, pyridylcarbonyloxy, lower alkylaminocarbonyloxy or lower alkylthio and containing, in the case of a monoalkylation with an unsubstituted alkylating agent, from 2 to 7 carbon atoms, and the alkyl group in the lower alkanoylating agent being substituted if desired by halogen.

In this procedure a compound represented by formula V is dissolved in an organic solvent, e.g., a lower alkanol, preferably methanol or ethanol, an ether such as dioxane, or a di-lower alkyl ketone such as acetone or dimethylformamide, and the resulting mixture is treated with an alkali metal carbonate or alkaline earth metal carbonate, preferably sodium carbonate or potassium carbonate. The mixture thus obtained is treated with the alkylating, alkenylating or alkynylating agent. Conventional alkylating, alkenylating or alkynylating agents such as, for example, halides with the exception of fluorides, alkylsulphonyloxy derivatives, preferably mesyloxy derivatives, or arylsulphonyloxy derivatives, preferably tosyloxy derivatives can be used. The reaction is advantageously carried out at a temperature between 0°C. and the boiling point of the mixture, preferably at the reflux temperature. If it is desired to manufacture compounds represented by formula I in which $R_1$ represents, for example, halo lower alkyl, hydroxy lower alkyl, lower alkoxy lower alkyl or lower alkylthio lower alkyl and/or $R_2$ represents lower alkoxy lower alkyl or hydroxy lower alkyl, the appropriate alkylating agents which are substituted in the lower alkyl group by halogen, hydroxy, alkoxy or alkylthio are used. The pressure is not critical; the reaction can be carried out in an open vessel.

d. reacting a compound represented by the formula

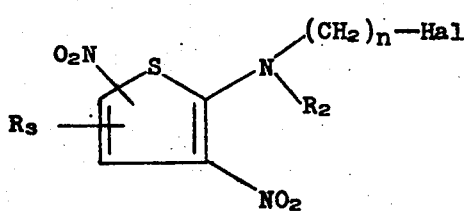

VI wherein $R_2$, $R_3$, n and Hal have the significance given above,
with an amine represented by formula III.

This reaction is carried out according to methods known per se, expediently in the presence of an excess of an amine represented by formula III which can thus serve as the solvent. The reaction can, however, also be carried out in an inert organic solvent such as a hydrocarbon e.g., benzene or toluene, a chlorinated hydrocarbon e.g., methylene chloride, an ether e.g., diethyl ether and the like. The excess amine represented by formula III can also serve as an acid-binding agent. However, there can also be used for this purpose other bases such as potassium carbonate, sodium carbonate and the like. The temperature and pressure are not critical, but the reaction is preferably carried out at a temperature between about 0°C. and the reflux temperature of the reaction mixture. If a gaseous amine represented by formula III is used, the reaction is expediently carried out at a pressure of 1–100 atmospheres. If, on the other hand, a liquid amine is used, the reaction is expediently carried out at normal pressure.

e. lower alkanoylating a compound represented by the formula

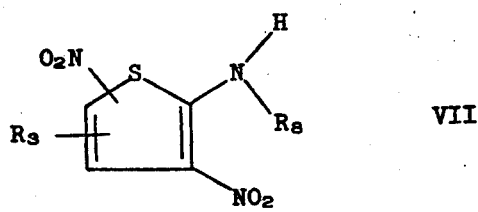

VII wherein $R_3$ has the significance given above and $R_8$ represents lower alkyl, lower alkenyl, lower alkynyl, lower alkoxy lower alkyl, lower alkylthio lower alkyl or halo lower alkyl, the alkyl group in the alkanoylating agent being substituted if desired by halogen.

f. reacting a compound represented by the formula

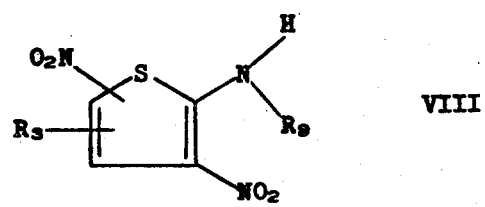

VIII wherein $R_3$ has the significance given above and $R_9$ represents lower alkylcarbonyl or halo lower alkylcarbonyl,
with a lower alkylating, lower alkenylating or lower alkynylating agent, the alkyl group in the lower alkylating agent being substituted if desired by halogen, hydroxy, lower alkoxy, lower alkanoyloxy, lower aroyloxy, pyridylcarbonyloxy, lower alkylaminocarbonyloxy or lower alkylthio.

These processes of alkanoylation of a compound represented by formula VII or alkylation, alkenylation of a compound represented by formula VIII are carried out in the manner and with the reagents detailed above for embodiment c) of the process.

g. treating a compound represented by formula I in which $R_1$ and $R_2$ together with the nitrogen atom to which they are attached represent a 3-membered saturated heterocyclic ring with a lower alkanol in the presence of an acid. Preferably a strong organic or mineral acid is used, e.g. p-toluolsulfonic acid, trifluoroacetic acid, sulfuric acid, nitric acid etc. Sulfuric acid is prefered.

h. reacting a compound represented by the formula

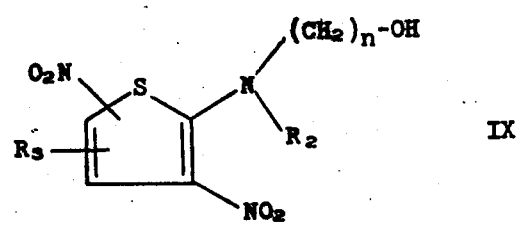

IX wherein R₂, R₃ and n have the significance given above with a lower alkanoylating, lower aroylating or pyridoylating agent or with a lower alkyl isocyanate.

The reaction is carried out using a suitable functional derivative of a corresponding carboxylic acid, for example, a lower alkanecarboxylic acid such as actic acid or a lower arylcarboxylic acid such as benzoic acid. Amongst the suitable reactive functional derivatives of such carboxylic acids for the acylation of compounds represented by formula V or IX there may be mentioned, for example, the anhydrides such as acetic anhydride, chloroacetic acid anhydride and the like, acid halides such as acetyl chloride and benzoyl chloride, imidazolides such as propionic acid imidazolide and chloroacetic acid imidazolide as well as other reactive derivatives suitable as acylating agents.

The conditions used for the foregoing acylation are not critical and can be readily selected according to the carboxylic acid derivative chosen as the alkanoylating agent. The acylation can be carried out, for example, at room temperature or at a temperature above or below room temperature depending on the chosen reagent. Moreover, the acylation is expediently carried out in a conventional inert organic solvent such as a hydrocarbon e.g., benzene, toluene and the like, a chlorinated hydrocarbon e.g., methylene chloride and the like, an ether e.g., tetrahydrofuran and the like, dimethylformamide, pyridine and the like.

The acylation can also be advantageously carried out in the absence of an inert solvent, in which case the acylating agent serves as the solvent. Further, it is expedient to add small amounts of dimethylformamide to the acylation.

If a compound represented by formula IX is reacted with a lower alkyl isocyanate there is obtained a compound represented by formula I in which $R_1$ represents lower alkylaminocarbonyloxy lower alkyl. This reaction is expediently carried out in an inert organic solvent such as, for example, ether, petroleum ether, dioxane, tetrahydrofuran, etc. The reaction can be carried out at a temperature above or below room temperature. A preferred temperature lies between 15°C. and 40°C. The reaction is expediently carried out in the presence of small amounts of a base. Organic bases such as pyridine, quinoline or triethylamine are preferred.

i. Converting a basic compound represented by formula I into a pharmaceutically acceptable acid addition salt.

Certain of the compounds represented by formula I which bear at least two nitrogen atoms in the side chain, e.g. N'-(3,5-Dinitro-2-thienyl)-N,N-diethylethylenediamine are basic and the manufacture of their acid addition salts, especially those which are pharmaceutically acceptable, also forms part of the present invention. These salts can be manufactured from the corresponding bases according to generally known methods by reaction with suitable inorganic or organic acids. Examples of organic or inorganic acids which can be used for the manufacture of pharmaceutically acceptable acid addition salts are hydrochloric acid, hydrobromic acid, sulphuric acid, acetic acid, succinic acid, maleic acid, methanesulphonic acid, benzenesulphonic acid, p-toluenesulphonic acid, etc. The non-pharmaceutically acceptable acid addition salts of the compounds represented by formula I can be converted into pharmaceutically acceptable acid addition salts; for example, by salt-exchange or by liberation of the base and subsequent salt formation with a suitable pharmaceutically acceptable acid. The dinitro substitution is responsible for an acidic character of those compounds of formula I which bear only one nitrogen atom in the side chain, e.g. N,N-dimethyl-3,5-dinitro-2-thiophenamine.

Certain of the starting materials represented by formula II are novel. They are prepared by nitrating a compound represented by the formula

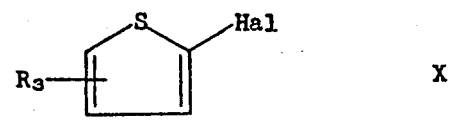

X wherein Hal and R₃ have the significance given above, with a nitrating agent of the type previously described in connection with embodiment b) of the process.

Certain of the starting materials represented by formula IV are also novel. The compounds represented by formula IV in which Y represents hydrogen can be prepared by reducing the nitro group in a compound represented by the formula

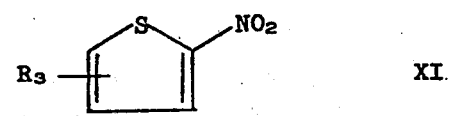

XI.

wherein R₃ has the significance given in formula IV, to the amino group and introducing the substituents R₁ and R₂ as described above. The reduction is carried out using concentrated aqueous hydrochloric acid and fine tin powder at 40°-45°C. as described in Ann. 403, 17 (1914). An amine thus obtained can be mononitrated after protection of the amino group with, for example, an acetyl group. After hydrolysis of the protecting group and introduction of the substituents R₁ and R₂, a compound represented by formula IV in which Y represents a nitro group is obtained. For the mononitration, a protected amine is dissolved in acetic anhydride and the mixture is mixed with a solution of glacial acetic acid and nitric acid (65–100 percent) at a temperature between −30°C. and +40°C. The working up is carried out by conventional means. The introduction of the substituents R₁ and R₂ is carried out in the manner described above.

The reduction of a compound represented by formula X yields a compound represented by the formula

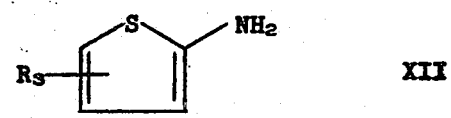

XII wherein R₃ has the significance given in formula IV, and such a compound, after protection of the amino group and nitration in the manner described above as well as subsequent removal of the protecting group, yields a compound represented by the formula

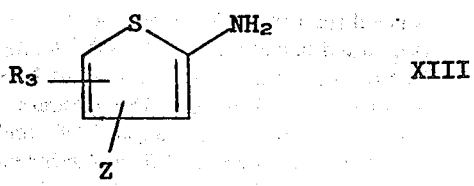

XIII wherein $R_3$ has the significance given above and Z represents nitro.

A starting material represented by formula V is obtained from a compound represented by formula XII by dinitration as described above. The compounds represented by formulae VI, VII and VIII are obtained by alkylation or alkanoylation of compounds represented by formula V as previously described herein.

The compounds represented by formula I and the pharmaceutically acceptable acid addition salts of those compounds which are basic possess protozoacidal, bactericidal, anthelmintic and schistosomicidal activity. They can be used, for example, for the therapy of bilharzia. The schistosomicidal activity predominates in the 3,5-dinitro-thiophene compounds while, in the 3,4-dinitro-thiophene compounds, the bactericidal activity predominates. The following test demonstrates the schistosomicidal activity of compounds represented by formula I:

Golden hamsters are infected subcutaneously with 60 cercaria of Schistosoma mansoni. Approximately 42 days after the infestion, the hamsters are treated on 5 successive days with the test compounds. 5–10 hamsters are used per compound and dosage (mg./kg.). 10 untreated hamsters are used as controls. The dissection is carried out 6 days or 2–3 weeks after the termination of the treatment. Worm pairs in the mesenteric veins, portal vein and liver are dissected out and counted. The percentage distribution of the worm pairs in the mesenteric veins, portal vein and liver is calculated and the condition of the worms (living, dead) registered. The action of the compound is shown in an increased proportion of worms in the vessels of the liver and in the appearance of dead worms.

For evaluation, the percentage proportion of living and dead worm pairs in the vessels of the liver is compared not only in the infected treated hamsters but also in the infected but untreated control hamsters. The calculation of the $SD_{90}$ (Shift Dose 90 percent, i.e., the dose which dispels 90 percent of the worm pairs into the liver in a group of treated hamsters) and the $VD_{90}$ (vermicidal Dose 90 percent, i.e., the dose which kills 90 percent of the worm pairs) is carried out according to the Probit method.

Representative test results are compiled in the following Table:

The compounds represented by formula I and pharmaceutically acceptable acid addition salts of those compounds which are basic can be used as medicaments in the form of pharmaceutical preparations which contain them in association with a compatible pharmaceutical carrier material. This carrier material can be a conventional organic or inorganic carrier material suitable for enteral or parenteral administration such as gelatin, lactose, starch, gum arabic, magnesium stearate, talc, vegetable oils, polyalkyleneglycols, petroleum jelly and the like. The pharmaceutical preparations can be made up in solid form (e.g., as tablets or dragees) or in liquid form (e.g., as solutions, suspensions or emulsions). They can contain adjuvants such as preservatives, stabilizers, wetting agents, emulsifiers, salts for the variation of the osmotic pressure or buffers. They may also contain other therapeutically active materials.

Expedient pharmaceutical dosage forms contain 100–500 mg., preferably about 250 mg., of active ingredient.

The dosage is chosen according to the individual requirements. For example, the compounds represented by formula I can be administered in dosages of about 10 mg./kg. to about 50 mg./kg. per day p.o., preferably 25 mg./kg. per day p.o. These amounts can be administered in a single dosage or in several subdivided dosages according to the requirements of the patient and instruction of the attending physician. Expediently, the dose is administered in relation to the condition of the patient on several successive days, preferably on 5 to 8 successive days.

EXAMPLE 1

10 g. of 2-chloro-3,5-dinitrothiophene are treated in 200 ml. of methanol with 5.5 ml. of ethyleneimine and stirred at room temperature. The reaction product precipitates and is filtered off under a vacuum. The precipitated product is washed with a small amount of methanol, methanol/petroleum ether and petroleum ether (low boiling) and purified on a short column (150 g. of silica gel; eluant: methylene chloride). There is obtained 1-(3,5-dinitro-2-thienyl)-aziridine of melting point 140°C. (from methylene chloride/petroleum ether).

EXAMPLE 2

10 g. of 2-chloro-3,5-dinitrothiophene are treated in 100 ml. of methanol with 9 g. of morpholine and stirred at room temperature. The reaction product is isolated by distilling off the methanol. The resulting product is purified directly on a Kieselgel column. There is obtained 4-(3,5-dinitro-2-thienyl)-morpholine from methylene chloride/petroleum ether as a pure crystalline product of melting point 133°–136°C.

TABLE

| Compound | $SD_{90}$ mg./kg. | $VD_{90}$ mg./kg. |
| --- | --- | --- |
| 2-Chloro-N-(3,5-dinitro-2-thienyl)-acetamide | 215 | 215 |
| N-Methyl-3,5-dinitro-2-thiophenamine | 155 | 175 |
| N-(2-Chloroethyl)-3,5-dinitro-2-thiophenamine | 165 | 180 |
| N,N-Dimethyl-3,5-dinitro-2-thiophenamine | 180 | 195 |
| 3-(3,5-Dinitro-2-thienyl)-thiazolidine | <150 | <150 |
| N'-(3,5-Dinitro-2-thienyl)-N,N-dimethylethylenediamine | 210 | 215 |
| N-(2-Hydroxyethyl)-3,5-dinitro-2-thiophenamine | 150 | 200 |
| N-(2-Methoxyethyl)-3,5-dinitro-2-thiophenamine | 205 | 210 |
| 1-(3,5-Dinitro-2-thienyl)-piperidine | 205 | 240 |
| N-Methyl-N-allyl-3,5-dinitro-2-thiophenamine | 220 | 190 |

EXAMPLE 3

10 g. of 2-chloro-3,5-dinitrothiophene are treated in 100 ml. of methanol with 7 g. of pyrrolidine and stirred at room temperature. Thereafter the methanol is distilled off. The resulting product, 1-(3,5-dinitro-2-thienyl)-pyrrolidine, which is crystallized from methylene chloride/petroleum ether, melts at 120°–125°C.

EXAMPLE 4

500 mg. of 2-chloro-N-(3-benzoyl-2-thienyl)-acetamide are introduced into 2.5 ml. of concentrated sulphuric acid at −10°C. and stirred. A solution of 0.3 ml. of concentrated nitric acid ($d=1.42$) and 0.5 ml. of concentrated sulphuric acid is added dropwise and the mixture is stirred at −10°C. for 0.5 hour.

The mixture is poured on to ice in 10 percent sodium bicarbonate solution and the aqueous solution extracted several times with methylene chloride. The combined methylene chloride solutions are dried over magnesium sulphate, filtered and concentrated. The mixture is purified on a Kieselgel column and crystallized from ethanol. There is obtained 2-chloro-N-(3,5-dinitro-2-thienyl)-acetamide of melting point 144°–150°C.

EXAMPLE 5

7.5 g. of chloroacetic anhydride and 5 ml. of ether are added to 6.4 g. of 2-amino-thiophene chlorohydrate-tin chloride in 18 ml. of water. 8 g. of sodium hydroxide in 8 ml. of water are then added dropwise over a period of 10–15 minutes with ice-cooling and stirring. The precipitated product is filtered off under a vacuum and partly dissolved in methylene chloride which had been dried over magnesium sulphate.

After filtration and concentration of the methylene chloride solution, the mixture is purified on a Kieselgel column (eluant: methylene chloride) to obtain 2-chloro-N-2-thienyl-acetamide of melting point 136°C. (from ether/petroleum ether).

EXAMPLE 6

A. 200 g. of 2-amino-thiophene chlorohydrate-tin chloride are stirred with 680 g. of potassium carbonate, 200 ml. of chloroacetyl chloride and 2 liters of ethyl acetate while cooling with ice/sodium chloride at 0°–10°C. There are then added dropwise 1,500 ml. of water. The ethyl acetate is then separated and the aqueous solution washed several times with ethyl acetate. The combined ethyl acetate solutions are then dried over magnesium sulphate, filtered and concentrated. The residue is partly dissolved in methylene chloride and the insoluble material boiled several times with methylene chloride and decanted off. The combined methylene chloride solutions are evaporated to obtain crude 2-chloro-N-2-thienyl-acetamide.

B. 90 g. of the crude 2-chloro-N-2-thienyl-acetamide are dissolved at −10°C. in 250 ml. of concentrated sulphuric acid and a precooled (−10°C.) nitrating solution (100 ml. of concentrated sulphuric acid and 72 ml. of concentrated nitric acid: 65 percent, $d=1.4$) is slowly added dropwise with stirring and with control of the temperature at −10°C. Immediately after the completion of the addition of the nitrating agent, the mixture is poured on to ice and extracted several times with ethyl acetate. The combined ethyl acetate solutions are washed three times with water, dried over magnesium sulphate, filtered and concentrated. The residue is purified on a Kieselgel column (500 g. of Kieselgel) (eluant: methylene chloride). The product 2-chloro-N-(3,5-dinitro-2-thienyl)-acetamide of melting point 145°–147°C. is crystallized from methylene chloride/petroleum ether. A further purification of the product can be carried out as follows:

44 g. of 2-chloro-N-(3,5-dinitro-2-thienyl)-acetamide are dissolved in 1 liter of methylene chloride and boiled with 8 g. of active carbon, filtered off, concentrated somewhat and treated with petroleum ether to obtain the purified product having a melting point of 149°–150°C.

EXAMPLE 7

Following the procedures of Example 6A and B, 2-bromo-N-(3,5-dinitro-2-thienyl)-acetamide of melting point 138°–139°C. (from methylene chloride/petroleum ether) is obtained by reacting 2-amino-thiophene chlorohydrate-tin chloride and bromoacetyl bromide.

EXAMPLE 8

Following the procedures of Example 6A, 4-chloro-N-2-thienyl-butyramide of melting point 94°–96°C. (from ether/petroleum ether) is obtained by reacting 2-amino-thiophene chlorohydrate-tin chloride and 3-chloro-butyric acid chloride.

EXAMPLE 9

Following the procedures of Example 6B, 4-chloro-N-(3,5-dinitro-2-thienyl)-butyramide of melting point 90°–92°C. (from methylene chloride/petroleum ether) is obtained by nitration of 4-chloro-N-2-thienylbutyramide.

EXAMPLE 10

12 g. of N-methyl-3,5-dinitro-2-thiophenamine are heated overnight under reflux in 30 ml. of chloroacetyl chloride with the addition of a few drops of dimethylformamide. The chloroacetyl chloride is then distilled off on a rotary evaporator. The residue is then dissolved in methylene chloride and washed with 10 percent bicarbonate solution.

The methylene chloride solution is then dried over magnesium sulphate, filtered and concentrated. The residue is purified on a Kieselgel column (300 g. of Kieselgel; eluant: methylene chloride) to obtain 2-chloro-N-(3,5-dinitro-2-thienyl)-N-methylacetamide of melting point 94°–96°C. (from ether/hexane).

EXAMPLE 11

5 g. of 2-chloro-3,5-dinitrothiophene are suspended in 50 ml. of absolute methanol and treated with 5 g. of chloroethylamine hydrochloride and 5 g. of potassium carbonate. The mixture is warmed on a steam bath for 5 minutes, the methanol is evaporated and the residue extracted with methylene chloride/water.

The methylene chloride solution is then dried over magnesium sulphate, filtered and concentrated. The residue is purified on a Kieselgel column (eluant: methylene chloride). The product, N-(2-chloroethyl)-3,5-dinitro-2-thiophenamine of melting point 137°C., is crystallized from ethanol.

EXAMPLE 12

Following the procedures of Example 11, 4-[2-[(3,5-dinitro-2-thenyl)-amino]-ethyl]-morpholine which is recrystallized from methylene chloride/petroleum ether and has a melting point of 203°C., is obtained utilizing 5 g. of 2-chloro-3,5-dinitrothiophene, 40 ml. of methanol, 10 g. of 1-amino-2-morpholino-ethane dihydrochloride and 5 g. of potassium carbonate and reacting overnight with stirring.

EXAMPLE 13

Following the procedures of Example 2, N-isobutyl-3,5-dinitro-2-thiophenamine which is recrystallized from methylene chloride/petroleum ether and has a melting point of 80°-82°C. is obtained by reacting 10 g. of 2-chloro-3,5-dinitrothiophene and 8 g. of isobutylamine and using 120 ml. of methanol as solvent.

EXAMPLE 14

Following the procedures of Example 13, N-secbutyl-3,5-dinitro-2-thiophenamine of melting point 85°-87°C. (from methylene chloride/petroleum ether) is obtained by reacting 2-chloro-3,5-dinitrothiophene and 2-aminobutane.

EXAMPLE 15

Following the procedures of Example 11, N-allyl-3,5-dinitro-2-thiophenamine of melting point 87°-88°C. (from methylene chloride/petroleum ether) is obtained by reacting 10 g. of 2-chloro-3,5-dinitrothiophene and 9 ml. of allylamine using 100 ml. of methanol as solvent.

EXAMPLE 16

Following the procedures of Example 11, N-isopropyl-3,5-dinitro-2-thiophenamine of melting point 140°-142°C. (from methylene chloride/petroleum ether) is obtained by reacting 10 g. of 2-chloro-3,5-dinitrothiophene and 6.5 g. of isopropylamine using 120 ml. of methanol as solvent.

EXAMPLE 17

Following the procedures of Example 11, there is obtained N-ethyl-3,5-dinitro-2-thiophenamine of melting point 141°-143°C. (from methylene chloride/petroleum ether) is obtained by reacting 10 g. of 2-chloro-3,5-dinitrothiophene and 5 g. of ethylamine dissolved in 20 ml. of methanol and using as the solvent 100 ml. methanol.

EXAMPLE 18

Following the procedures of Example 11, N-butyl-3,5-dinitro-2-thiophenamine of melting point 60°-64°C. (from ethanol) is obtained by reacting 10 g. of 2-chloro-3,5-dinitrothiophene and 8 g. of n-butylamine using 100 ml. of methanol as solvent.

EXAMPLE 19

1 g. of 1-(3,5-dinitro-2-thienyl)-aziridine is suspended in 15 ml. of methanol containing 3 drops of concentrated sulphuric acid and heated on a steam bath for 5 minutes under anhydrous conditions. After standing for 15 minutes at room temperature, the mixture is concentrated and the residue extracted with methylene chloride/10 percent bicarbonate solution. The methylene chloride solution is then dried over magnesium sulphate, filtered and concentrated. The residue is purified on Kieselgel column to obtain N-(2-methoxyethyl)-3,5-dinitro-2-thiophenamine of melting point 140°-141°C. (from methylene chloride/petroleum ether).

EXAMPLE 20

20 g. of 1-(3,5-dinitro-2-thienyl)-aziridine are heated on a steam bath for 15 minutes in 400 ml. of water, 200 ml. of dioxane and 200 ml. of 2-N sulphuric acid. The resulting insoluble material is filtered off and the filtrate concentrated on a rotary evaporator to ca 200 ml. The resulting solution is then extracted three times with ethyl acetate. The combined ethyl acetate solutions are dried over magnesium sulphate, filtered and concentrated. The resulting residue is purified on a Kieselgel column (eluant: methylene chloride; methylene chloride/ethyl acetate 20%). The product, 2-[(3,5-dinitrothienyl)-amino]-ethanol of melting point 127°-130°C., is then crystallized from ethyl acetate/petroleum ether.

EXAMPLE 21

Following the procedures of Example 11, N,N-dimethyl-3,5-dinitro-2-thiophenamine of melting point 155°C. (recrystallized from ethanol) is obtained by reacting 2-chloro-3,5-dinitrothiophene and 5 g. of dimethylamine using 100 ml. of methanol as solvent.

EXAMPLE 22

6.4 g. of N-allyl-3,5-dinitro-2-thiophenamine are stirred overnight at room temperature in 60 ml. of absolute acetone with 4.5 g. of potassium carbonate (anhydrous, finely powdered) and 4 ml. of dimethyl sulphate. The resulting precipitated inorganic material is then filtered off and washed with acetone. The combined acetone solutions are concentrated and purified on a Kieselgel column to obtain N-allyl-N-methyl-3,5-dinitro-2-thiophenamine of melting point 77°-78°C. (from methylene chloride/petroleum ether).

EXAMPLE 23

Following the procedures of Example 22, N-isobutyl-N-methyl-3,5-dinitro-2-thiophenamine of melting point 116°-118°C. (from methylene chloride/petroleum ether) is obtained by the reaction of 5.2 g. of N-isobutyl-3,5-dinitro-2-thiophenamine, 5 g. of potassium carbonate and 3.6 g. of dimethyl sulphate using 80 ml. of acetone as solvent.

EXAMPLE 24

Following the procedures of Example 22, N-ethyl-N-methyl-3,5-dinitro-2-thiophenamine of melting point 65°-66°C. (from methylene chloride/petroleum ether) is obtained by reacting 7 g. of N-ethyl-3,5-dinitro-2-thiophenamine, 13 g. of potassium carbonate and 7.5 ml. of dimethyl sulphate using 100 ml. of acetone as solvent.

EXAMPLE 25

Following the procedures of Example 2, 1-(3,5-dinitro-2-thienyl)-piperidine is obtained by reacting 2 g. of 2-chloro-3,5-dinitrothiophene and 17 g. of piperidine using 40 ml. of methanol as solvent. The product, crystallized from ether/petroleum ether, melts at 88°-90°C.

EXAMPLE 26

Following the procedures of Example 22 but stirring for 3 days at room temperature instead of overnight, N-(2-methoxyethyl)-N-methyl-3,5-dinitro-2-thiophenamine is obtained by reacting 10 g. of N-(2-methoxyethyl)-3,5-dinitro-2-thiophenamine, 10 g. of potassium carbonate and 6 ml. of dimethyl sulphate using 100 ml. of acetone as solvent. The product is crystallized from methylene chloride/petroleum ether and melts at 74°C.

EXAMPLE 27

Following the procedures of Example 1, N-(3-ethoxypropyl)-3,5-dinitro-2-thiophenamine is obtained by reacting 8 g. of 2-chloro-3,5-dinitrothiophene and 8 g. of ethoxy-propylamine, using 120 ml. of ethanol as solvent. The product is crystallized from methylene chloride/petroleum ether and melts at 86°C.

EXAMPLE 28

Following the procedures of Example 1, N'-(3,5-dinitro-2-thienyl)-N,N-dimethylethylenediamine is obtained by reacting 8 g. of 2-chloro-3,5-dinitrothiophene and 9 ml. of dimethylaminoethylamine, using 100 ml. of ethanol as solvent. The product is crystallized from ethanol and melts at 117°C.

EXAMPLE 29

Following the procedures of Example 2, 1-[(3,5-dinitro-2-thienyl)-amino]-2-propanol is obtained by reacting 8 g. of 2-chloro-3,5-dinitrothiophene and 6 g. of 1-amino-2-propanol, utilizing as solvent 100 ml. of ethanol. The product is crystallized from methylene chloride/petroleum ether and melts at 112°C.

EXAMPLE 30

Following the procedures of Example 1, 4-(3,5-dinitro-2-thienyl)-1-piperazine-ethanol, is obtained by reacting 8 g. of 2-chloro-3,5-dinitrothiophene and 10.4 g. of hydroxyethylpiperazine, using 120 ml. of ethanol as solvent. The product is crystallized from methylene chloride/petroleum ether and melts at 120°C.

EXAMPLE 31

Following the procedures of Example 1, 1-(3,5-dinitro-2-thienyl)-4-methylpiperazine is obtained by reacting 8 g. of 2-chloro-3,5-dinitrothiophene and 8 g. of N-methylpiperazine, using 120 ml. of ethanol as solvent. This product is crystallized from methylene chloride/petroleum ether and melts at 125°C.

EXAMPLE 32

1.4 g. of 2-[(3,5-dinitro-2-thienyl)-amino]-ethanol are treated in 30 ml. of methylene chloride with 1.2 g. of isonicotinic acid chloride. The resulting product is heated at reflux for 0.5 hour, then poured on to 10% ice/sodium bicarbonate solution, extracted with ether and dried over sodium sulphate. The filtered solution is concentrated and purified over a short column (30 g. of silica; eluant: methylene chloride/petroleum ether). The product, 2-[(3,5-dinitro-2-thienyl)-amino]-isonicotinic acid ethyl ester which is obtained by crystallizing from methanol/methylene chloride melts at 185°–188°C.

EXAMPLE 33

Following the procedures of Example 11, 2-(3,5-dinitro-2-thienyl)-isoxazolidine is obtained by reacting 8 g. of 2-chloro-3,5-dinitrothiophene, 5 g. of potassium carbonate and 5 g. of isoxazolidine hydrochloride, using 100 ml of methanol as solvent. The product is crystallized from methylene chloride/petroleum ether and melts at 150°C.

EXAMPLE 34

Following the procedures of Example 20, N-(2-methylthioethyl)-3,5-dinitro-2-thiophenamine, is obtained by reacting 20 g. of 1-(3,5-dinitro-2-thienyl)-aziridine, 100 ml. of dioxane solvent saturated with methyl mercaptan, the dropwise addition of a total of 3–4 ml. of concentrated sulphuric acid and further introduction of methyl mercaptan. The product is crystallized from methylene chloride/petroleum ether and melts at 114°C.

EXAMPLE 35

Following the procedures of Example 2, N-(2-methylthioethyl)-3,5-dinitro-2-thiophenamine is obtained by reacting 20 g. of 2-chloro-3,5-dinitrothiophene and 2-methylthioethylamine (prepared from 24 g. of 2-chloroethylamine chlorohydrate, 10 g. of methyl mercaptan and 25 g. of potassium hydroxide), using 200 ml. ethanol as solvent. The product is crystallized from methylene chloride/petroleum ether and melts at 114°C.

EXAMPLE 36

Following the procedures of Example 13, 2-[(3,5-dinitro-2-thienyl)-amino]-acetic acid ethyl ester, is obtaitned by reacting 2 g. of 2-[(3,5-dinitro-2-thienyl)-amino]-ethanol in 30 ml. of methylene chloride with 1 g. of acetyl chloride and 1 g. of piperidine. The product is crystallized from methylene chloride/petroleum ether and melts at 165°C.

EXAMPLE 37

Following the procedures of Example 14, 2-(3,5-dinitro-2-thienyl)-tetrahydro-2H-1,2-oxazine, is obtained by reacting 20 g. of 2-chloro-3,5-dinitrothiophene, 17 g. of isoxazine chlorohydrate and 15 g. of potassium carbonate, using 200 ml. of methanol as solvent. The product is crystallized from methylene chloride/petroleum ether and melts at 86°–88°C.

EXAMPLE 38

Following the procedures of Example 2, N'-(3,5-dinitro-2-thienyl)-N,N-diethylethylenediamine, is obtained by reacting 8 g. of 2-chloro-3,5-dinitrothiophene and 8.5 g. of diethylaminoethylamine, using 150 ml. of ethanol as solvent. The product is crystallized from methylene chloride/petroleum ether and melts at 75°–76°C.

EXAMPLE 39

Following the procedures of Example 1, N'-(3,5-dinitro-2-thienyl)-N,N-diethyl-1,3-propanediamine is obtained by reaction of 10 g. of 2-chloro-3,5-dinitrothiophene and 13 g. of 3-diethylamino-1-propylamine, using 100 ml. of ethanol as solvent. The product is crystallized from ethyl acetate/petroleum ether and melts at 116°C.

EXAMPLE 40

2.8 g. of 2-[(3,5-dinitro-2-thienyl)-amino]-ethanol, 1 ml. of methyl isocyanate and 4 drops of triethylamine in 30 ml. of dioxane are mixed together and left to stand for 6 days at room temperature. The mixture is then concentrated and chromatographed on a Kieselgel column [eluant: methylene chloride/ethyl acetate (10:1)]. The resulting 2-[(3,5-dinitro-2-thienyl)-amino]-ethylmethylcarbamate is crystallized from ethanol/methylene chloride and melts at 170°–174°C.

EXAMPLE 41

Following the procedures of Example 2, 4-[(3,5-dinitro-2-thienyl)-amino]-1-butanol is obtained by the reaction of 10 g. of 2-chloro-3,5-dinitrothiophene and 9 g. of 4-aminobutanol-1, using 120 ml. of ethanol as solvent. The product is recrystallized from ethanol/methylene chloride/petroleum ether and melts at 90°C.

EXAMPLE 42

Following the procedures of Example 2, 3-(3,5-dinitro-2-thienyl)-thiazolidine is obtained by reacting 5 g. of 2-chloro-3,5-dinitrothiophene and 4.5 g. of thiazolidine, using 70 ml. of ethanol as solvent. The product is crystallized from methylene chloride/petroleum ether and melts at 126°–128°C.

EXAMPLE 43

20 g. of 2,5-dibromo-3,4-dinitrothiophene are treated in 200 ml. of methanol with 5.5 g. of dimethylamine in 55 ml. of methanol. The resulting mixture is stirred at room temperature for 2 hours, the methanol evaporated and the residue extracted with methylene chloride/water. The methylene chloride solution is then dried over magnesium sulphate, filtered and concentrated. The resulting residue is purified on a Kieselgel column (eluant: methylene chloride). 5-bromo-N,N-dimethyl-3,4-dinitro-2-thiophenamine is crystallized from methylene chloride/petroleum ether and melts at 139°–141°C.

EXAMPLE 44

8 g. of 2-bromo-4-methyl-3,5-dinitrothiophene are treated in 100 ml. of ethanol with 4 g. of ethylene imine in 20 ml. of ethanol. The resulting mixture is stirred at room temperature. There is first obtained a clear solution and then the reaction product crystallizes out. After cooling with ice, the product is filtered off and crystallized from methylene chloride/petroleum ether to yield 1-(4-methyl-3,5-dinitro-2-thienyl)-aziridine having a melting point of 161°C.

EXAMPLE 45

Following the procedures of Example 11, 4-(3,5-dinitro-2-thienyl)-tetrahyro-2H-1,4-thiazine which melts at 158°–164°C. after recrystallization from methylene chloride/petroleum ether is obtained, after stirring a mixture of 20 g. of 2-chloro-3,5-dinitrothiophene, 300 ml. of methanol, 15 g. of thiomorpholine hydrochloride and 16 g. of potassium carbonate for a period of 2 hours.

EXAMPLE 46

5 g. of 2-[(3,5-dinitro-2-thienyl)-amino]-ethanol are boiled for 5 hours with 80 ml. of formic acid. The formic acid is then distilled off on a rotary evaporator. The resulting residue is dissolved in methylene chloride and washed with 10 percent bicarbonate solution. The methylene chloride solution is dried over magnesium sulphate, filtered and concentrated. The residue is purified on a Kieselgel column (eluant: methylene chloride) to yield 2-[(3,5-dinitro-2-thienyl)-amino]-ethyl formate which is crystallized from methanol/petroleum ether and melts at 122°C.

EXAMPLE 47

10 g. of N-methyl-3,5-dinitro-2-thiophenamine are heated to reflux for 5 hours in 35 ml. of propargyl bromide with the addition of 5 ml. of dimethylformamide and 10 g. of potassium carbonate. The propargyl bromide is distilled off and the residue dissolved in methylene chloride and washed with water. The resulting methylene chloride solution is dried over magnesium sulphate, filtered and concentrated. The residue is purified on a Kieselgel column (eluant: methylene chloride) to yield N-methyl-3,5-dinitro-4-(2-propynyl)-2-thiophenamine which is recyrstallized from methylene chloride/petroleum ether and melts at 117°–119°C.

EXAMPLE 48

Following the procedures of Example 6B, 2-chloro-N-(3,5-dinitro-2-thienyl)-acetamide which, after recrystallization from methylene chloride/petroleum ether, melts at 148°–151°C. is obtained by nitrating 2-chloro-N-(5-nitro-2-thienyl)-acetamide.

EXAMPLE 49

Following the procedures of Example 11, 4-[3-[(3,5-dinitro-2-thienyl)-amino]-propyl]-morpholine which melts at 125°C. after recrystallization from methylene chloride/petroleum ether is obtained after stirring a mixture of 7 g. of 2-chloro-3,5-dinitrothiophene, 60 ml. of methanol, 10 g. of 3-aminopropylmorpholine dihydrochloride and 12 g. of potassium carbonate.

EXAMPLE 50

Following the procedures of Example 1, N-(3-methoxypropyl)-3,5-dinitro-2-thiophenamine which melts at 87°C. after recrystallization from methylene chloride/petroleum ether is obtained by reacting 8 g. of 2-chloro-3,5-dinitrothiophene and 8 g. of methoxypropylamine, using 100 ml. of ethanol as solvent.

EXAMPLE 51

200 mg. of N-(2-chloromethyl)-3,5-dinitro-2-thiophenamine dissolved in 20 ml. of ethanol are heated at reflux for 10 hours with 170 mg. of morpholine and 100 mg. of potassium iodide. The resulting solution is evaporated on a rotary evaporator. The resulting residue is treated with methylene chloride and washed with water. The resulting methylene chloride solution is dried over sodium sulphate, filtered and concentrated. The residue is purified on a Kieselgel column [eluant: methylene chloride/ethyl acetate (20:1)]. The product, 4-[2-[(3,5-dinitro-2-thienyl)-amino]-ethyl]-morpholine, crystallizes from methylene chloride/petroleum ether and has a melting point of 202°–204°C.

EXAMPLE 52

Following the procedures of Example 43, 5-bromo-N-(2-methoxyethyl)-3,4-dinitro-2-thiophenamine which melts at 143°C. after recrystallization from methylene chloride/petroleum ether is obtained by reacting 1.5 g. of 2,5-dibromo-3,4-dinitrothiophene and 760 mg. of methoxyethylamine, using 80 ml. of ethanol as solvent.

EXAMPLE 53

Following the procedures of Example 2, 3-[(3,5-dinitro-2-thienyl)-amino]-1-propanol which melts at 114°C. after recrystallization from methylene chloride/petroleum ether is obtained by reacting 2-chloro-3,5-dinitrothiophene and 6 g. of 3-amino-1-propanol, using 80 ml. of ethanol as solvent.

EXAMPLE 54

Following the procedures of Example 44, N-(2-methoxyethyl)-4-methyl-3,5-dinitro-2-thiophenamine which melts at 115°C. after recrystallization from ethanol is obtained by reacting 10 g. of 2-bromo-4-methyl-3,5-dinitrothiophene and 6 g. of methoxyethylamine, using 200 ml. ethanol as solvent.

The following Examples illustrate typical pharmaceutical preparations containing the compounds represented by formula I:

EXAMPLE A

Capsules of the following composition are produced:

| | |
|---|---|
| Compound of formula I | 250.0 mg. |
| Lactose | 155.0 mg. |
| Maize starch | 30.0 mg. |
| Talc | 15.0 mg. |
| | 450.0 mg. |

The compound of formula I is mixed homogeneously with the lactose and maize starch, passed through a screen-machine and, after intermixing of the talc, filled into gelatin capsules No. 4.

| | |
|---|---|
| Filled capsule weight | 450 mg. |
| Content of compound of formula I | 250 mg. |

EXAMPLE B

Tablets of the following composition are produced:

| | |
|---|---|
| Compound of formula I | 250.0 mg. |
| Lactose | 100.0 mg. |
| Maize starch | 85.0 mg. |
| Ethyl cellulose | 10.0 mg. |
| Talc | 4.5 mg. |
| Magnesium stearate | 0.5 mg. |
| | 450.0 mg. |

The compound of formula I is mixed with the lactose and maize starch and granulated with a solution of the ethyl cellulose in 40 ml. of methylene chloride. The granulate is dried at 40°C., mixed with the talc and magnesium stearate and pressed to tablets.

| | |
|---|---|
| Weight of one tablet | 450 mg. |
| Content of compound of formula I | 250 mg. |

We claim:

1. A compound represented by the formula

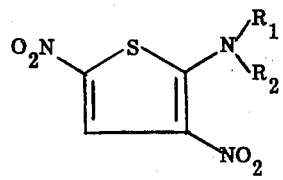

wherein $R_1$ represents lower alkyl, lower alkenyl, lower alkynyl, halo lower alkyl, hydroxy lower alkyl, lower alkoxy lower alkyl, lower alkylthio lower alkyl, lower alkylcarbonyl, halo lower alkylcarbonyl, lower alkanoyloxy lower alkyl, benzoyloxy lower alkyl, naphthoyloxy lower alkyl, lower alkyl benzoyloxy lower alkyl, lower alkyl naphthoyloxy lower alkyl, lower alkyl pyridylcarbonyloxy lower alkyl, lower alkylaminocarbonyloxy lower alkyl,

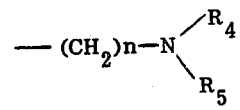

wherein $R_4$ and $R_5$ each represent hydrogen or lower alkyl or $R_4$ and $R_5$ taken together with the nitrogen atom are aziridinyl, pyrrolidinyl, piperidinyl, azepinyl, thiazolidine, isoxazolidine, pyrazolidine, imidazolidine, oxazolidine, piperazinyl, morpholinyl, thiamorpholinyl, diazepinyl, thiazepinyl, oxazepinyl, lower alkyl or hydroxy lower alkyl substituted thiazolidine, isoxazolidine, pyrazolidine, imidazolidine, oxazolidine, piperazinyl, morpholinyl, thiamorpholinyl, diazepinyl, thiazepinyl, or oxazepinyl, and $n$ is 1, 2, 3 or 4, $R_2$ represents hydrogen, lower alkyl, lower alkenyl, lower alkynyl, lower alkoxy lower alkyl or hydroxy lower alkyl or $R_1$ and $R_2$ taken together with the nitrogen atom is aziridinyl, pyrrolidinyl, azepinyl, thiazolidine, isoxazolidine, pyrazolidine, imidazolidine, oxazolidine, piperazinyl, morpholinyl, thiamorpholinyl, diazepinyl, thiazepinyl, oxazepinyl, lower alkyl or hydroxy lower alkyl substituted thiazolidine, isoxazolidine, pyrazolidine, imidazolidine, oxazolidine, piperazinyl, morpholinyl, thiamorpholinyl, diazepinyl, thiazepinyl or oxazepinyl, with the proviso that when $R_1$ represents lower alkyl and $R_2$ represents hydrogen, the $R_1$ represents lower alkyl containing 2 to 7 carbon atoms, and a pharmaceutically acceptable acid addition salt of the compounds which are basic.

2. A compound as defined in claim 1 wherein $R_1$ represents lower alkyl and $R_2$ represents hydrogen or lower alkyl.

3. A compound as defined in claim 1 wherein $R_1$ represents

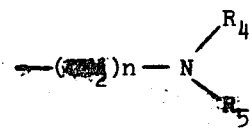

wherein $R_4$, $R_5$ and n are as defined in claim 1.

4. A compound as defined in claim 3 wherein $R_4$ and $R_5$ taken together with the nitrogen atom are piperidinyl, piperazinyl, morpholinyl, thiamorpholinyl, lower alkyl or hydroxy lower alkyl substituted piperidinyl, piperazinyl, morpholinyl, or thiamorpholinyl and $n$ is 2.

5. A compound as defined in claim 3 wherein $R_2$ is hydrogen.

6. A compound as defined in claim 1 wherein $R_1$ is lower alkenyl, and $R_2$ is hydrogen or lower alkyl.

7. A compound according to claim 1 which is 1-(3,5-dinitro-2-thienyl)-aziridine.

8. A compound according to claim 1 which is 4-(3,5-dinitro-2-thienyl)-morpholine.

9. A compound according to claim 1 which is 1-(3,5-dinitro-2-thienyl)-pyrrolidine.

10. A compound according to claim 1 which is 2-chloro-N-(3,5-dinitro-2-thienyl)-acetamide.

11. A compound according to claim 1 which is 2-bromo-N-(3,5-dinitro-2-thienyl)-acetamide.

12. A compound according to claim 1 which is 4-chloro-N-(3,5-dinitro-2-thienyl)-butyramide.

13. A compound according to claim 1 which is 2-chloro-N-(3,5-dinitro-2-thienyl)-N-methyl-acetamide.

14. A compound according to claim 1 which is N-(2-chloroethyl)-3,5-dinitro-2-thiophenamine.

15. A compound according to claim 1 which is 4-[2-[(3,5-dinitro-2-thienyl)-amino]-ethyl]-morpholine.

16. A compound according to claim 1 which is N-isobutyl-3,5-dinitro-2-thiophenamine.

17. A compound according to claim 1 which is N-secbutyl-3,5-dinitro-2-thiophenamine.

18. A compound according to claim 1 which is N-allyl-3,5-dinitro-2-thiophenamine.

19. A compound according to claim 1 which is N-isopropyl 3,5-dinitro-2-thiophenamine.

20. A compound according to claim 1 which is N-ethyl-3,5-dinitro-2-thiophenamine.

21. A compound according to claim 1, which is N-butyl-3,5-dinitro-2-thiophenamine.

22. A compound according to claim 1 which is N-(2-methoxyethyl)-3,5-dinitro-2-thiophenamine.

23. A compound according to claim 1 which is 2-[(3,5-dinitrothienyl)-amino]-ethanol.

24. A compound according to claim 1 which is N,N-dimethyl-3,5-dinitro-2-thiophenamine.

25. A compound according to claim 1 which is N-allyl-N-methyl-3,5-dinitro-2-thiophenamine.

26. A compound according to claim 1 which is N-isobutyl-N-methyl-3,5-dinitro-2-thiophenamine.

27. A compound according to claim 1 which is N-ethyl-N-methyl-3,5-dinitro-2-thiophenamine.

28. A compound according to claim 1 which is 3-(3,5-dinitro-2-thienyl)-thiazolidine.

29. A compound according to claim 1 which is 2-(3,5-dinitro-2-thienyl)-isoxazolidine.

30. A compound according to claim 1 which is 4-(3,5-dinitro-2-thienyl)-1-piperazine-ethanol.

31. A compound according to claim 1 which is 1-(3,5-dinitro-2-thienyl)-4-methylpiperazine.

32. A compound according to claim 1 which is 2-(3,5-dinitro-2-thienyl)-tetrahydro-2H-1,2-oxazine.

33. A compound according to claim 1 which is N'-(3,5-dinitro-2-thienyl)-N,N-diethylethylenediamine.

34. A compound according to claim 1 which is N'-(3,5-dinitro-2-thienyl)-N,N-diethyl-1,3-propanediamine.

35. A compound according to claim 1 which is 2-[(3,5-dinitro-2-thienyl)-amino]-ethylmethylcarbamate.

36. A compound according to claim 1 which is 4-[(3,5-dinitro-2-thienyl)-amino]-1-butanol.

37. A compound according to claim 1 which is N-(2-methoxyethyl)-N-methyl-3,5-dinitro-2-thiophenamine.

38. A compound according to claim 1 which is N-(3-ethoxypropyl)-3,5-dinitro-2-thiopenamine.

39. A compound according to claim 1 which is N'-(3,5-dinitro-2-thienyl)-N,N-dimethylethylenediamine.

40. A compound according to claim 1 which is 1-[(3,5-dinitro-2-thienyl)-amino]-2-propanol.

41. A compound according to claim 1 which is 2-[(3,5-dinitro-2-thienyl)-amino]-ethyl isonicotinate.

42. A compound according to claim 1 which is N-(2-methylthio-ethyl)-3,5-dinitro-2-thiophenamine.

43. A compound according to claim 1 which is 2-[(3,5-dinitro-2-thienyl)-amino]-ethyl acetate.

* * * * *

UNITED STATES PATENT AND TRADEMARK OFFICE
CERTIFICATE OF CORRECTION

PATENT NO. : 3,880,849
DATED : April 29, 1975
INVENTOR(S) : Andre Szente and Joseph Hellerbach It is certified that error appears in the above-identified patent and that said Letters Patent are hereby corrected as shown below:

Column 20, lines 60-65, claim 3, "$-(-)_n-N\begin{smallmatrix}R_4\\R_5\end{smallmatrix}$" should be $-(CH_2)_n-N\begin{smallmatrix}R_4\\R_5\end{smallmatrix}$ Column 22, line 32, "thiopenamine" should be thiophenamine Signed and Sealed this fifteenth Day of June 1976

[SEAL]

Attest:

RUTH C. MASON
Attesting Officer

C. MARSHALL DANN
Commissioner of Patents and Trademarks